(12) United States Patent
Brown et al.

(10) Patent No.: US 9,771,014 B2
(45) Date of Patent: Sep. 26, 2017

(54) STEP RELEASE TENSION ASSEMBLY

(71) Applicants: Raymond Brown, Modesto, CA (US); Manuel Lopez, Lodi, CA (US)

(72) Inventors: Raymond Brown, Modesto, CA (US); Manuel Lopez, Lodi, CA (US)

(*) Notice: Subject to any disclaimer, the term of this patent is extended or adjusted under 35 U.S.C. 154(b) by 193 days.

(21) Appl. No.: 14/175,998

(22) Filed: Feb. 7, 2014

(65) Prior Publication Data

US 2015/0224912 A1   Aug. 13, 2015

(51) Int. Cl.
*B60P 7/00* (2006.01)
*B60P 7/08* (2006.01)

(52) U.S. Cl.
CPC ................................ *B60P 7/083* (2013.01)

(58) Field of Classification Search
USPC ......................................... 254/218, 238, 239
See application file for complete search history.

(56) References Cited

U.S. PATENT DOCUMENTS

| | | | |
|---|---|---|---|
| 5,103,536 A | 4/1992 | Kamper | |
| 5,271,606 A | 12/1993 | Kamper | |
| 6,799,750 B2* | 10/2004 | Chen | B60P 7/083 |
| | | | 24/68 R |
| 6,880,810 B1 | 4/2005 | Hu | |
| 7,444,718 B1 | 11/2008 | Chang | |
| 7,854,043 B2* | 12/2010 | Wang | B60P 7/083 |
| | | | 24/68 CD |

* cited by examiner

*Primary Examiner* — Emmanuel M Marcelo (57) ABSTRACT

A tension assembly comprising a step release track for an incremental release of a load tension, is disclosed herein.

7 Claims, 11 Drawing Sheets

STEP RELEASE TENSION ASSEMBLY

BACKGROUND

The present disclosure relates generally to a tension assembly, and more particularly to a tension assembly having, among other things, a step release track for a relatively safer, efficient, versatile, and incremental release of a tension from a load secured with the tension assembly.

Modern tension assemblies used to secure cargo are usually of two types, specifically, cam buckle or ratching style technologies.

A typical ratchet assembly includes a rotatable hub with a plurality of outwardly-extending teeth for engagement with a spring-loaded pawl. A terminal end of the ratchet assembly is anchored to a first point. As the spool is rotated in one direction, a line, such as a flat webbing attached to a second point is wrapped around the hub to apply a tension to the line. As the hub rotates, the pawl engages the teeth to prevent the hub from rotating in the opposite direction due to the tension from the line.

Cam buckle assembly technology differs in that the cam buckle is depressed to open the teeth of the assembly while manual tension in applied to pull the webbing through the cam buckle. The webbing is typically held in place by a back pressure on the closed teeth of the cam buckle.

Although tension assemblies are well known, release of a load under tension is an all or nothing proposition. If the load has moved during transport, once tension is released the load may further shift or fall creating a potential danger or safety hazard to the person releasing the tension or individuals and property in the vicinity of the load.

As such, it would be desirable to provide an improved tension assembly having, among other things, a step release track for a relatively safer, efficient, versatile, and incremental release of a tension from a load secured with the tension assembly.

SUMMARY

For purposes of summarizing the disclosure, exemplary concepts have been described herein. It is to be understood that not necessarily all such concepts may be achieved in accordance with any particular embodiment. Thus, for example, those skilled in the art will recognize that embodiments may be carried out in a manner that achieves or optimizes one concept as taught herein without necessarily achieving other concepts as may be taught or suggested herein.

In one embodiment, a tensioning assembly comprising a step release track for an incremental release of a load tension.

In another embodiment, a method of incrementally releasing a load tension comprises moving a handle assembly of a tension assembly along a step release track to incrementally release the load tension.

These and other embodiments will become apparent to those skilled in the art from the following detailed description of the various embodiments having reference to the attached figures, the disclosure not being limited to any particular embodiment.

DETAILED DESCRIPTION

Exemplary embodiments will now be described with references to the accompanying figures, wherein like reference numbers refer to like elements throughout. The terminology used in the description presented herein in not intended to be interpreted in any limited or restrictive manner simply because it is being utilized in conjunction with a detailed description of certain embodiments. Furthermore, various embodiments (whether or not specifically described herein) may include novel features, no single one of which is solely responsible for its desirable attributes or which is essential to practicing any of the embodiments herein described.

The present disclosure relates generally to a tension assembly, and more particularly to a tension assembly having, among other things, a step release track for a relatively safer, efficient, versatile, and incremental release of a load tension from a load secured with the tension assembly.

As used herein, the term "hub" is intended to include a spindle, a spool, a sheave, or a similar type article(s) that is configured or may be adapted to permit rotation of the hub to facilitate tensioning of a "strap" used for the purpose of applying tension to secure a "load".

As used herein, the term "strap" is intended to include a line, a rope (round synthetic, natural fiber, metal), a cable, a cord, a flat line (webbing), an anchor line or tensioning line, or a similar type of article(s) that may be adapted to be used with the tension assembly disclosed herein for the purpose of applying tension, herein referred to as a "load tension", to secure a "load".

As used herein, the term "load" or "cargo" is intended to include any item or items that are generally secured to prevent movement of the item(s) while in a static position, or while being moved or transport from one position to another position.

The tension assembly described herein provides, among other things, a relatively safer, efficient, versatile, and incremental release of a tension from a load secured with the tension assembly.

Various parts, elements, components, etc, of the tension assembly disclosed herein may be constructed from metal, plastic, composite, or other suitable material or combination thereof for providing a rigid and sturdy structure to facilitate tensioning of a line for the purpose of securing a load.

The actual size and dimension of any and all of the various parts, elements, components, etc., may vary depending on various factors including, among other things, intending application or usage of the tension assembly, as well as the size of the load to be secured or prevented from moving while in a static position, or while being moved or transport from one position to another position.

Connection(s) between the various parts, elements, components, etc., of the tension assembly may be accomplished using a variety of methods or processes. As such, the connections, whether integral and created via bending, or form molding, for example, or connected via bonding, hardware (nuts, bolts, washers, etc.), welding, or similar techniques, are well known in the art and omitted for simplicity.

Figure 1:
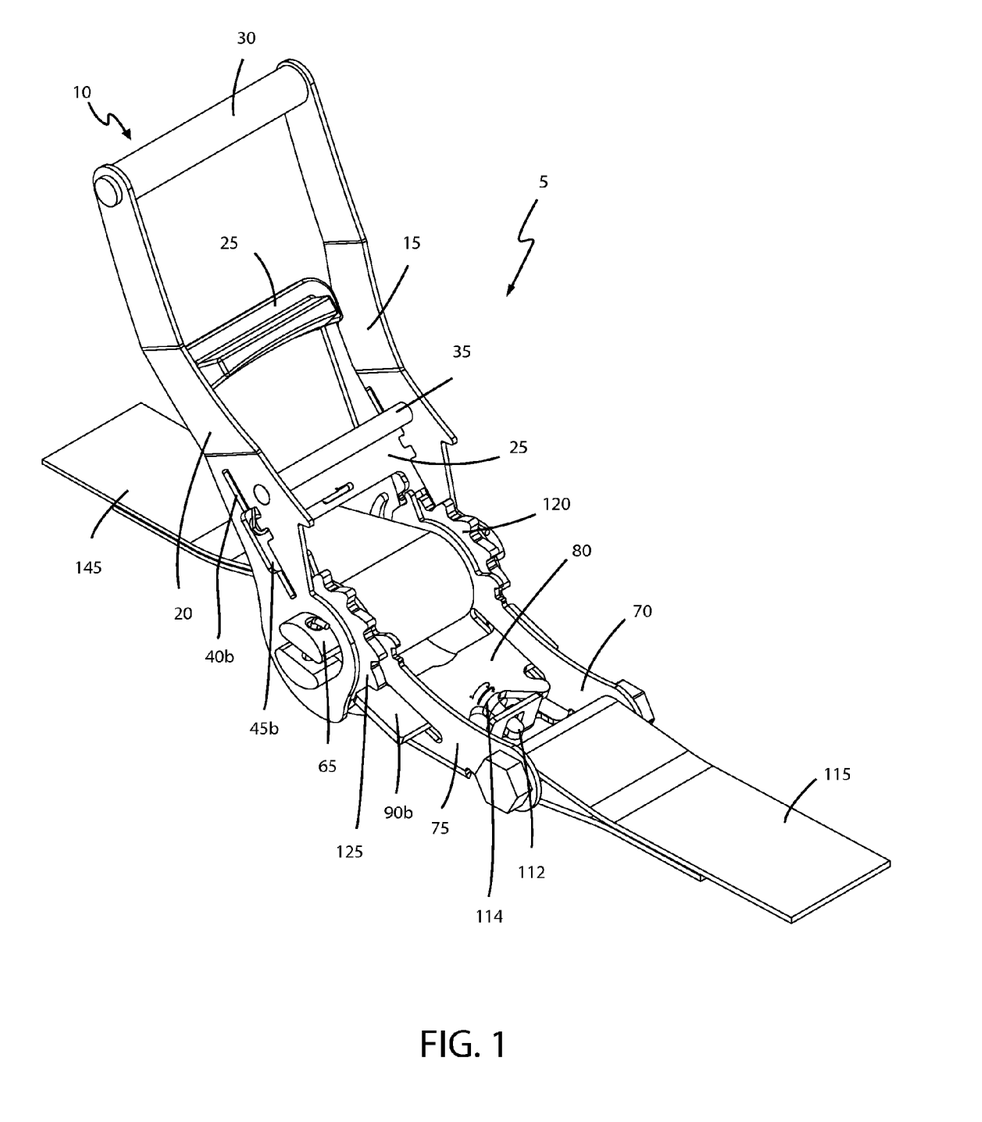
FIG. 1 shows a perspective view of a tension assembly in accordance with one embodiment disclosed herein.
Figure 2:
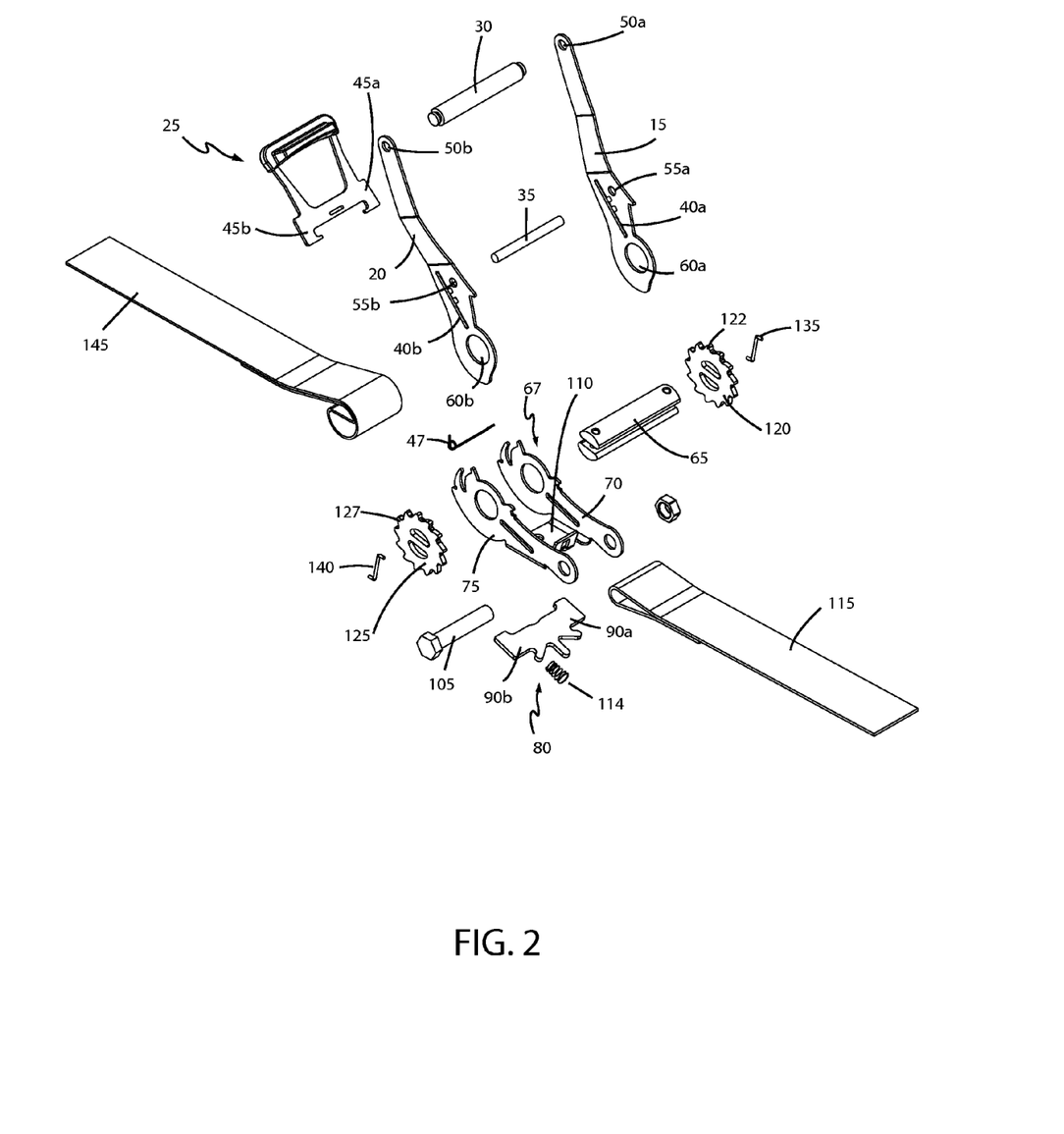
FIG. 2 shows an exploded view of the tension assembly of FIG. 1 in accordance with one embodiment disclosed herein.

FIG. 1 and FIG. 2 show a tension assembly in accordance with one embodiment disclosed herein. In one embodiment, the tension assembly 5 may be a ratchet assembly or similar device for applying a tension, i.e., load tension, to a load. The tension assembly 5 includes a handle assembly 10 including a first upper side frame 15, a second upper side frame 20, and an upper or drive pawl 25 disposed between and slidably connected to the first upper side frame 15 and the second upper side frame 20 of the handle assembly 10. A generally cylindrical shaped upper rod 30 and a generally cylindrical shaped lower rod 35 are connected between the first upper side frame 15 and the second upper side frame 20 for support and stability of the handle assembly 10.

The first upper side frame 15 and the second upper side frame 20 each include a slot 40a, 40b positioned opposite to each other for receiving corresponding flanges 45a, 45b positioned on opposite sides of the upper pawl 25 to permit the upper pawl 25 to slidably move within the slots 40a, 40b of the first upper side frame 15 and the second upper side frame 20. A tension clip 47 or similar mechanism is utilized to bias the upper pawl 25 within the slots 40a, 40b in a direction toward the hub 65 (described below).

The first upper side frame 15 and the second upper side frame 20 each further include an orifice or opening 50a, 50b for receiving the upper rod 30 therebetween; an orifice or opening 55a, 55b for receiving the lower rod 35 therebetween; and an orifice or opening 60a, 60b for receiving and permitting rotation of a generally cylindrical shaped hub or spindle 65 therebetween. The hub 65 may be formed as a single piece or multiple pieces with a slot between the pieces for receiving a strap 145, as shown in FIG. 2.

The tension assembly 5 further includes a lower frame assembly 67 having a first lower side frame 70, a second lower side frame 75, and a lower or main pawl 80 disposed between and slidably connected to the first lower side frame 70 and the second lower side frame 75 of the lower frame assembly 67. As shown in more detail in FIG. 3, the first lower side frame 70 and the second lower side frame 75 each include a slot 85a, 85b positioned opposite to each other for receiving corresponding flanges 90a, 90b positioned on opposite sides of the lower pawl 80 to permit the lower pawl 80 to slidably move within the slots 85a, 85b of the first lower side frame 70 and the second lower side frame 75.

Figure 3:
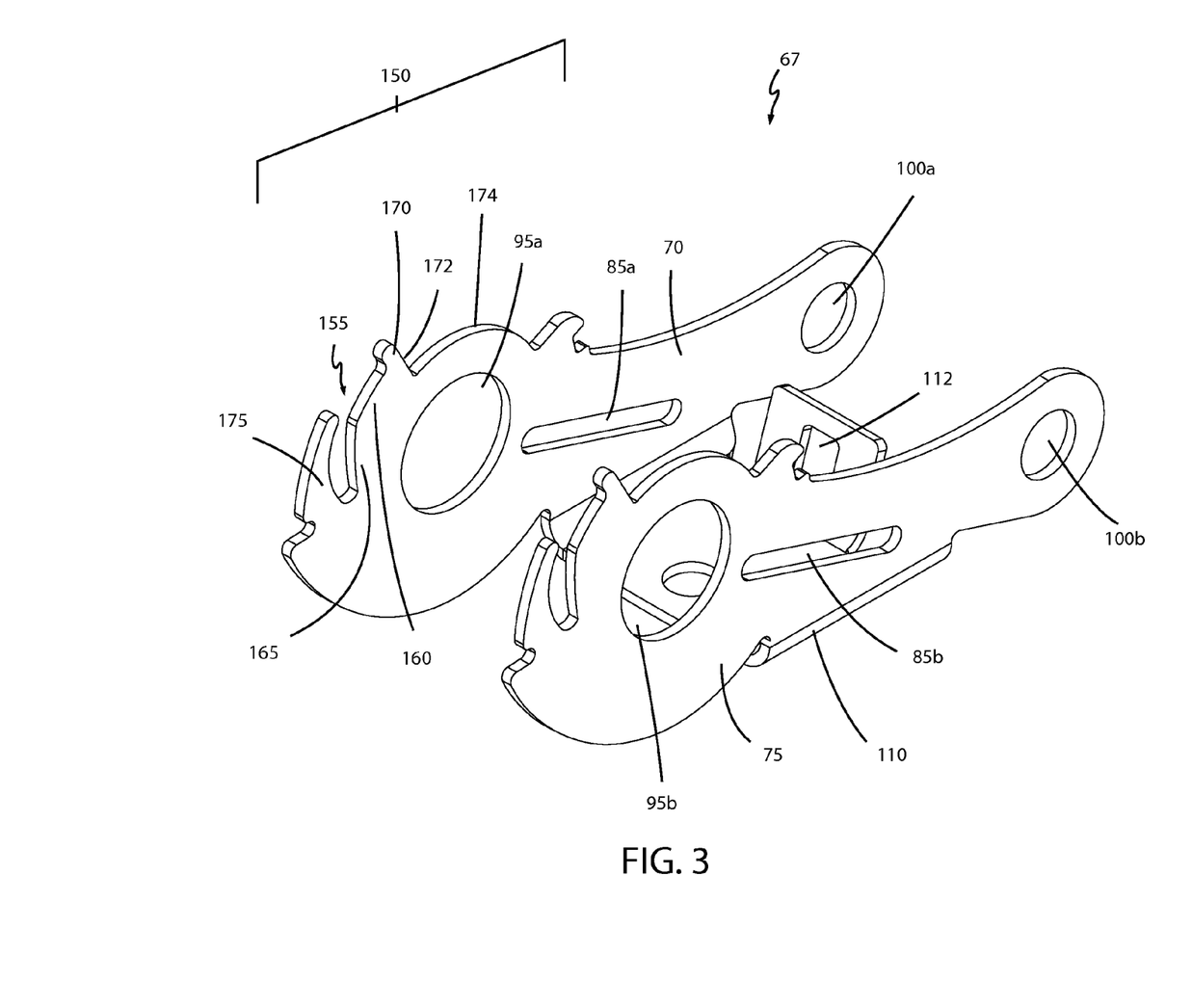
FIG. 3 shows a lower frame assembly of the tension assembly of FIG. 1 in accordance with one embodiment disclosed herein.

A bottom or base 110 is formed between the first lower side frame 70 and the second lower side frame 75 for support and stability of the tension assembly 5, and for receiving the lower pawl 80 in a orifice or opening 112 formed in the base 110. A spring 114 is disposed on a portion of the lower pawl 80 and is positioned around the opening 112 to bias the lower pawl 80 in a direction toward the hub 65 and permit the lower pawl 80 to slidably move within the slots 85a, 85b formed in the first lower side frame 70 and the second lower side frame 75.

The first lower side frame 70 and the second lower side frame 75 each further include an orifice or opening 95a, 95b for receiving and permitting rotation of the hub 65 therebetween; and an orifice or opening 100a, 100b for receiving a connection member or anchor post 105 therebetween. The connection member 105 may be a bolt and nut combination as shown in FIG. 2 or a similar device for support and stability of the tension assembly 5, and for connecting a first strap 115 to the tension assembly 5.

The tension assembly 5 includes a generally circular shaped first gear 120 having a plurality of teeth 122 formed on the circumference of the first gear 120, and a generally circular shaped second gear 125 having a plurality of teeth 127 formed on the circumference of the second gear 125. The first gear 120 is disposed on or about the hub 65 and is positioned between the first upper side frame 15 and the first lower side frame 70. The second gear 125 is likewise disposed on or about the hub 65 and is positioned between the second upper side frame 20 and the second lower side frame 75. As such, the first gear 120 and the second gear 125 are generally positioned near opposite ends of the hub 65.

A first pin 135 and a second pin 140 or similar type retention mechanism may be utilized to secure or otherwise assist in holding various components of the tension assembly 5 together. A second strap 145 may be secured to the hub 65 in a variety of methods. For example, as shown in FIG. 2, the second strap 145 is received in a slot between sections of a two piece hub 65.

As disclosed herein, when the tension assembly 5 is positioned to secure a load (not shown), the first strap 115 is secured to a first point, the second strap 145 secured to a second point, and the hub 65 is rotated in one direction to wrap the second line 145 around the hub 65 to apply a tension to the first strap 115 and second strap 145 and secure the load in place with a load tension.

As shown in FIG. 3, each of the first lower side frame 70 and the second lower side frame includes a cam lobe 150 formed thereon. The cam lobe 150 includes a step release track 155 for incremental release of tension from a secured load. For simplicity, the cam lobe 150 and the step release track 155 are described in regard to the first lower side frame 70, however it will be understood that a similarly structured and functional cam lobe 150 and step release track 155 are formed on the second lower side frame 75.

The step release track 155 includes an upper step or portion 160, and a lower step or portion 165 continuously formed with the upper step 160. The upper step 160 is elevated or at a greater height relative to the hub 65 than the lower step 165. The upper step 160 and the lower step 165 are shaped similar to a "step" with the upper step 160 forming an upper or top portion of the step and the lower step 165 forming a lower or bottom portion of the step. When the upper pawl 25 moves back-and-forth along the step release track 155, as described below, a load tension is incrementally released from the load.

In this regard, the upper step 160 forms one end of the step release track 155 and terminates at a protrusion 170 having a downward sloped face 172. The cam lobe 150 further includes a curved shaped tension track 174 that extends from the face 172 that the upper pawl 25 moves along when applying tension to secure a load. The lower step 165 forms the other end of the step release track 155 and terminates at the formation of a ledge 175 that overhangs the lower step 165 and extends toward the upper step 160.

Figure 4:
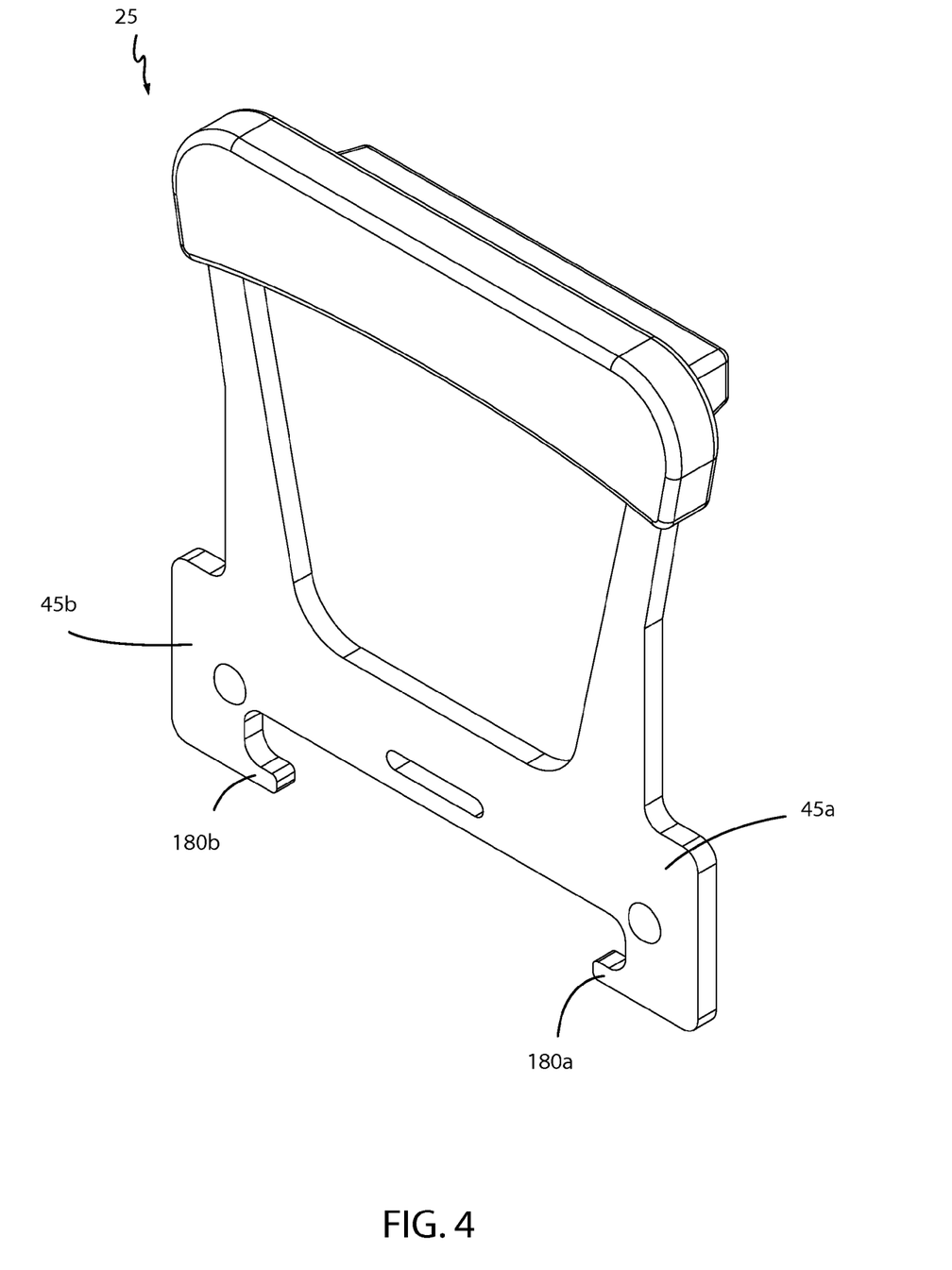
FIG. 4 shows an upper pawl of the tension assembly of FIG. 1 in accordance with one embodiment disclosed herein.

As shown in FIG. 4, flanges 45a, 45b positioned on opposite sides of the upper pawl 25 include a corresponding tip 180a, 180b. The tips 180a, 180b of the upper pawl 25 protrude inward toward each other to engage the teeth 122 of the first gear 120 and the cam lobe 150 of the first lower side frame 70, and the teeth 127 of the second gear 125 and the cam lobe 150 of the second lower side frame 75 when the flanges 45a, 45b of the upper pawl 25 are slidably positioned within the corresponding slots 40a, 40b of the first upper side frame 15 and the second upper side frame 20 (FIG. 1).

Figure 5A:
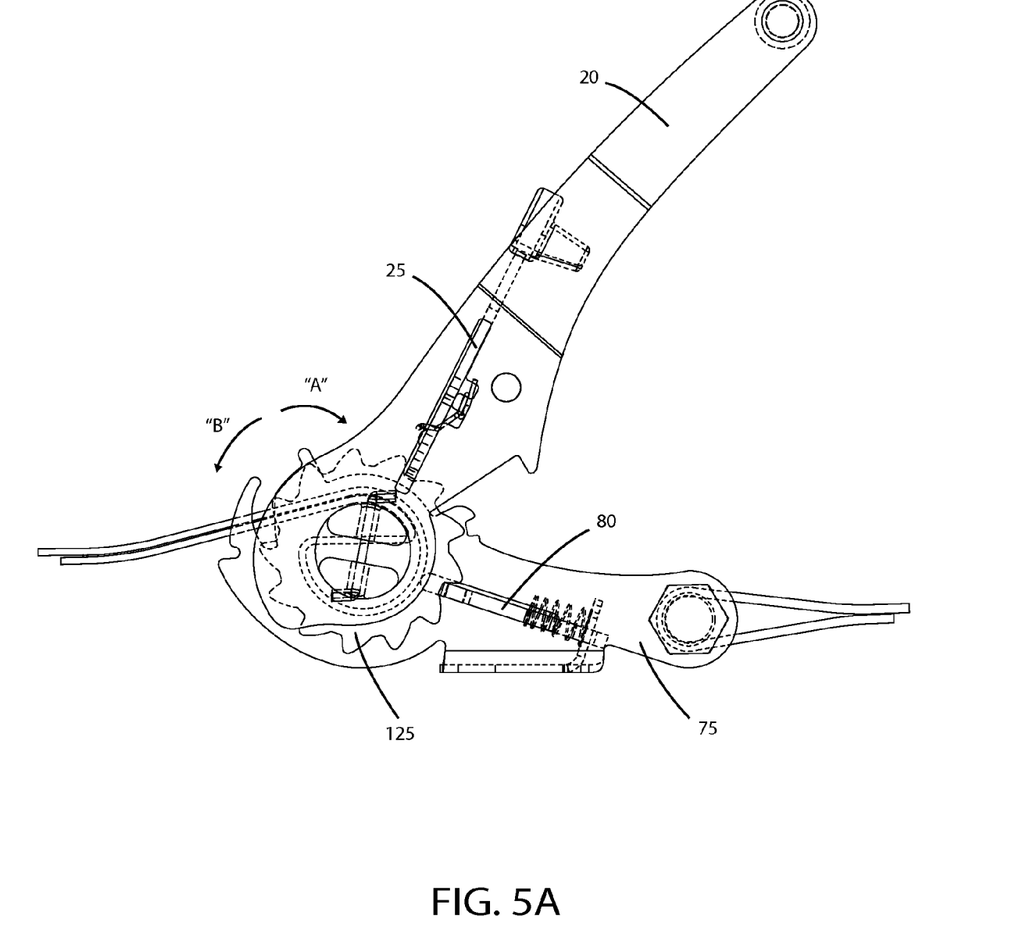
FIGS. 5A-5D show various positional arrangements of the tension assembly of FIG. 1 in accordance with one embodiment disclosed herein.
Figure 6:
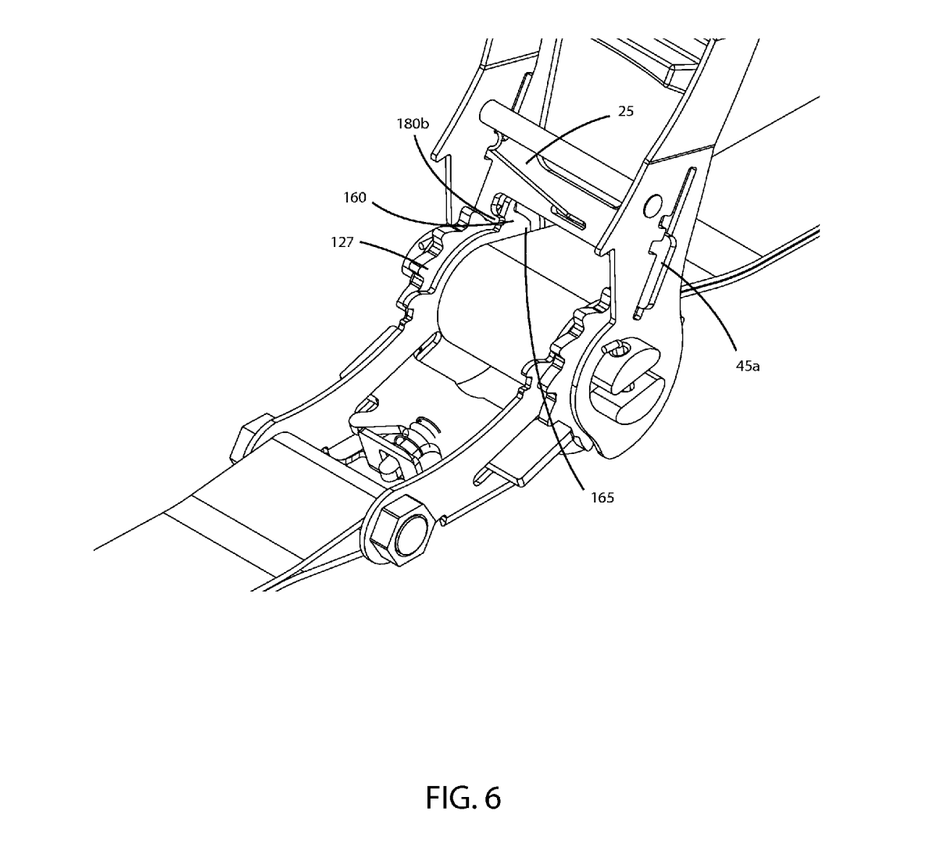
FIG. 6 shows the tension assembly of FIG. 1 in a tension position in accordance with one embodiment disclosed herein.

As shown in FIG. 6, when the tension assembly 5 is in a tension position and tension is to be applied to a load, the upper pawl 25 is biased by the tension clip 47 to position the tips 180a, 180b of the upper pawl 25 along the tension track 174 and engage the teeth 122, 127 of the gears 120, 125. In this regard, as shown in FIG. 5A, in the tension position as the handle assembly 10 is moved as shown by direction "A" one or more teeth 122, 127 may be engaged. When the handle assembly 10 is moved as shown by direction "B" the hub 65 is rotated to wrap the second strap 145 around the hub 65 to apply tension to the first strap 115 and the second strap 145 and secure the load. As further shown in FIG. 5A, in the tension position the lower pawl 80 is biased by the spring 114 to engage the teeth 122, 127 of the gears 120, 125. As such, as the hub 65 rotates in direction "B" and tension is applied to the load, the lower pawl 80 maintains load tension by prohibiting rotation of the hub 65 in direction "A". As such, back-and-forth motion of the upper pawl 65 along the tension track 174 increases load tension to secure the load.

Figure 5B:
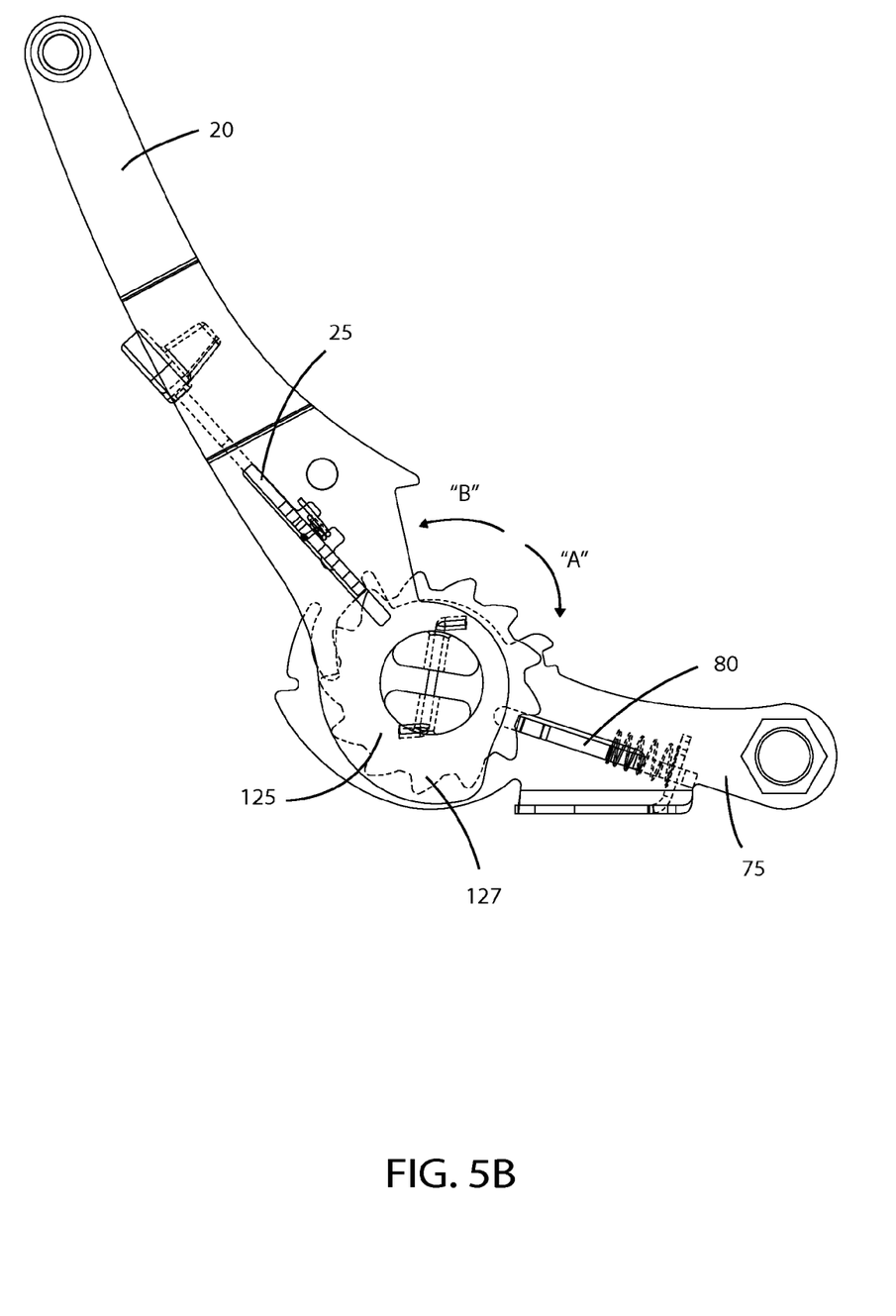
Figure 5C:
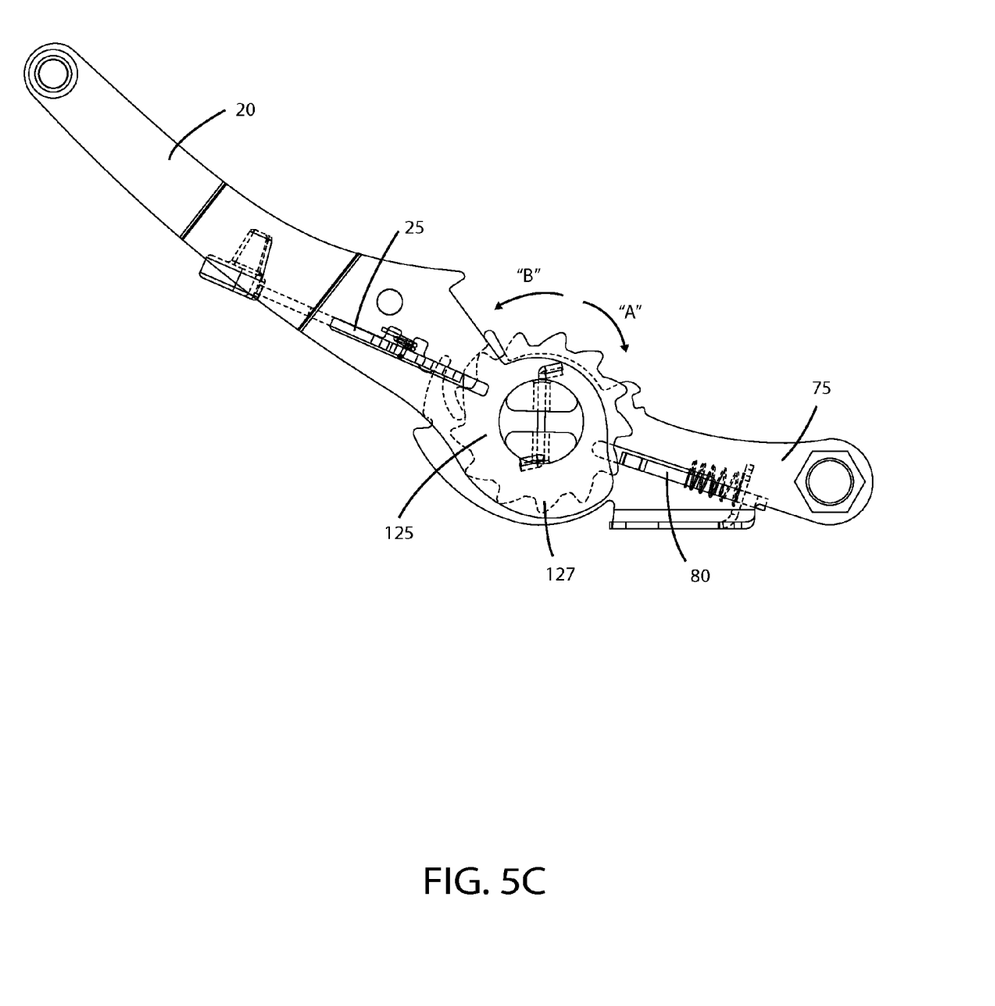
Figure 5D:
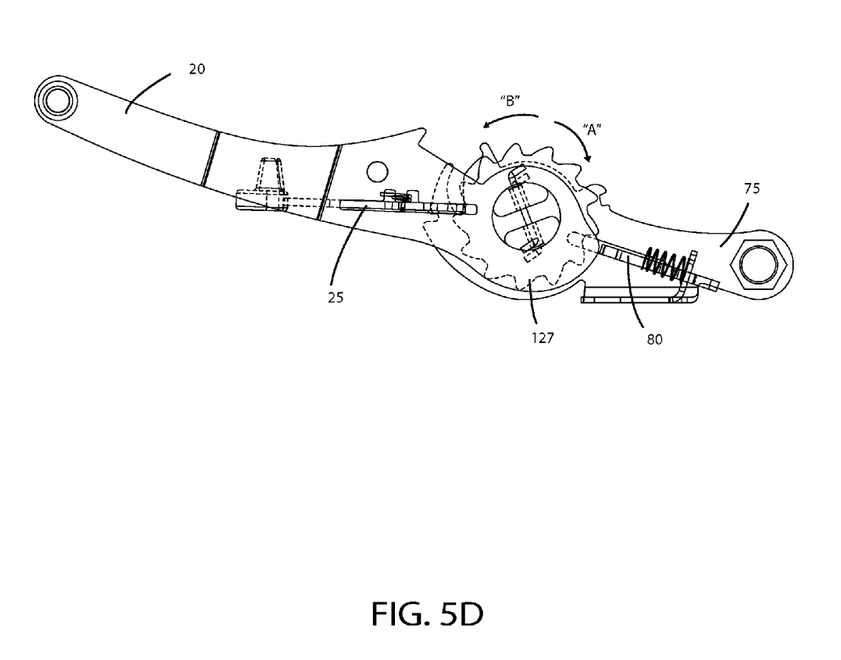
Figure 7:
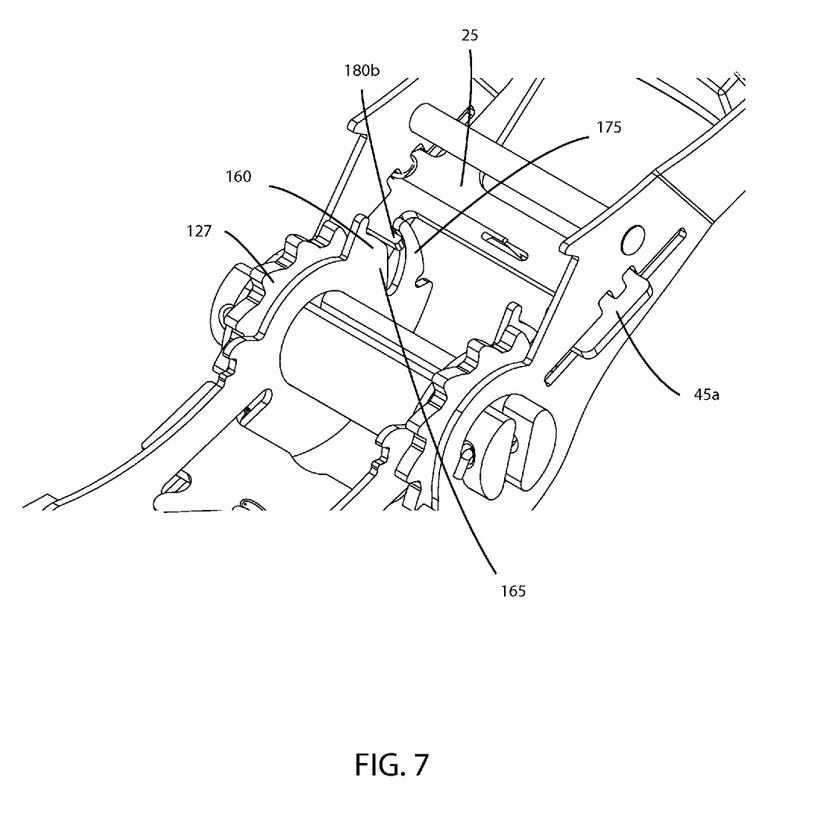
FIG. 7 shows the tension assembly of FIG. 1 in a step tension release position in accordance with one embodiment disclosed herein.

As shown in FIG. 5B and FIG. 7, when the tension assembly 5 is in a step tension release position and load tension is to be incrementally released by one tooth of the gears 120, 125 at a time, the upper pawl 25 is positioned on the upper step 160 of the step release track 155. In the step tension release position the tips 180a, 180b of the upper pawl 25 are raised above the teeth 122, 127 of the gears 120, 125. As shown in FIGS. 5C and 5D, as the handle assembly 10 is pulled in direction "B" the tips 180a, 180b move from the upper step 160 to the lower step 165. During movement from the upper step 160 to the lower step 165 the lower pawl 80 is pushed away from engagement of the teeth 122, 127 of the gears 120, 125 by the first upper side frame 15 and second upper side frame 20 to allow the gears 120, 125 to rotate. During movement of the tips 180a, 180b along the lower step 165, the lower pawl 80 remains disengaged from the teeth 122, 127 of the gears 120, 125 however, the upper pawl 25 once again engages with the teeth 122, 127 of the gears 120, 125. In this regard, the tension assembly 5 transitions from a load bearing state to a load releasing state as the load tension is shifted or transferred from the lower pawl 80 to the upper pawl 25. As the upper pawl 25 is moved back to the upper step 160, the hub 65 rotates in direction "A", the teeth 122, 127 of the gears 120, 125 move one tooth in direction "A", and the load tension shifts back to the lower pawl 80 allowing the second strap 145 to unwrap incrementally from the hub 65. The timing between the shifting of the load tension during the back-and-forth motion from the upper pawl 25 and the lower pawl 80 allows the tension assembly 5 to transition from a load bearing state to a load releasing state and the load tension to be incrementally released by one tooth of the gears 120, 125 at a time.

In summary, when a desired load tension is applied by the tension assembly 5 the step release track 155 allows a person to release the load tension incrementally from the load by one tooth of the gears 125, 127 at a time. The incremental or step release of the load tension is achieved by the timing of the transfer of load tension between the upper pawl 25 and the lower pawl 80 that is facilitated at least in part by the shape of the first upper side frame 15 and second upper side frame 20. When the upper pawl 25 is positioned in the step release track 155 there exists a limited stroke of operation for the handle assembly 10. When the handle assembly 10 is rotated to the lower step 165 the load tension is transferred to the upper pawl 25 as the lower pawl 80 is pushed away from the teeth 122, 127 of the gears 120, 125. By allowing the handle assembly 10 to move to the upper step 160 the main pawl 25 engages the teeth 122, 127 of the gears 120, 125 and the load tension is transferred to the upper pawl 25. Repeating the process of moving the handle assembly 10 back-and-forth from the upper step 160 to the lower step 165 allows rotational movement of the hub 65 in direction "A" to allow the incremental release of the load tension.

As such, safe operation of the tension assembly 5 is greatly enhanced over known tension assemblies as the operator has the ability to cease any further release of the load tension should the load shift and potentially cause damage or injury to individuals or property. In this regard, the tension assembly 5 is designed and structured to prevent the uncontrolled release of the load tension.

Figure 8:
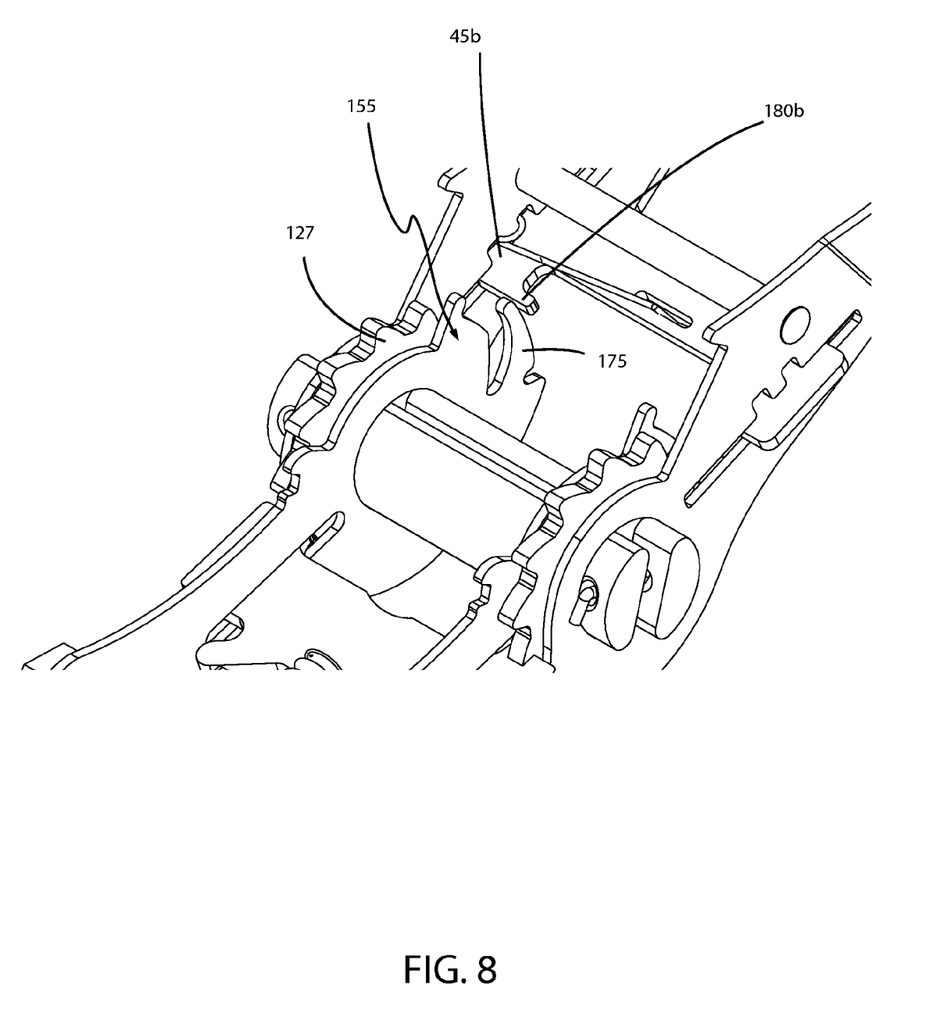
FIG. 8 shows the tension assembly of FIG. 1 in a full tension release position in accordance with one embodiment disclosed herein.

As shown in FIG. 8, the tension assembly 5 may be placed in a full tension release position to fully release the load tension by positioning the upper pawl 25 on the ledge 175 that overhangs the lower step 165 and extends toward the upper step 160. In the full tension release position the tips 180a, 180b of the upper pawl are disengaged from the teeth 122, 127 of the gears 120, 125. Likewise, the lower pawl 80 is disengaged from the teeth 122, 127 of the gears 120, 125 allowing the hub 65 to rotate in direction "A", unwrapping the second strap 145 from hub 65, and releasing the load tension from the load.

A method or process of tensioning a load and releasing tension from the load with the tension assembly 5 typically includes securing the second strap 145 to a relatively stable, secure, or stationary object; passing the second strap 145 over, around, about, etc. a load that is intended to be secured; and passing the second strap 145 through a slot formed in the hub 65 of the tension assembly 5. Securing the first strap 115 attached to the anchor post 105 of the tension assembly 5 to another relatively, stable, secure, or stationary object. Removing excess slack that may be present in the second strap 145 by pulling an end of the second strap 145 so that the second strap 145 is pulled taut through the slot of the hub 65. Rotating the handle assembly 10 of the tension assembly 5 in one direction to rotate the hub 65 to wrap the second strap 145 around the hub 65 to apply a tension to the first strap 115 and second strap 145 and secure the load in place.

Incremental release of the load tension that was placed on the first strap 115 and the second strap 145 and unsecuring the load is accomplished by positioning the handle assembly 10 in a step tension release position by positioning the handle assembly 10 along a step release track 155 of a cam lobes 150 formed on a lower frame assembly 67 and moving the handle assembly 10 back-and-forth along the step release track 155 from an upper step 160 of the step release track 155 to a lower step 165 of the step release track 155 to transfer load tension from an upper pawl 25 of the handle assembly 10 to a lower pawl 80. Repeating the process of moving the handle assembly 10 back-and-forth from the upper step 160 to the lower step 165 allows rotational movement of the hub 65 to allow an incremental release of the load tension.

As such, the subject matter disclosed herein provides for an improved tension assembly having, among other things, a step release track for a relatively safer, efficient, versatile, and incremental release of tension from a load secured with the tension assembly.

Although the method(s)/step(s) are illustrated and described herein as occurring in a certain order, the specific order, or any combination or interpretation of the order, is not required. Obvious modifications will make themselves apparent to those skilled in the art, all of which will not depart from the essence of the disclosed subject matter, and all such changes and modifications are intended to be encompassed within the appended claims.

What is claimed is:

1. A tension assembly comprising:
a handle assembly;
an upper pawl slidably connected to the handle assembly;
a lower frame assembly;
a lower pawl slidably connected to the lower frame assembly;
a hub received and rotatable disposed between the handle assembly and the lower frame assembly, and
a step shaped release track for an incremental release of a load tension,
wherein the step shaped release track is formed on the lower frame assembly and includes an upper step and a lower step formed continuously with the upper step, and
wherein the upper pawl moves along the upper step and the lower step to shift the load tension between a load bearing state and a load releasing state during the incremental release of the load tension.

2. The tension assembly of claim 1, further including a first gear and a second gear positioned at opposite ends of the hub to engage and disengage with the upper pawl and the lower pawl as the upper pawl moves along the upper step and the lower step to shift the load tension between the load bearing state and the load releasing state during the incremental release of the load tension.

3. The tension assembly of claim 2, wherein the upper pawl is disengaged with the first gear and the second gear, and the lower pawl is engaged with the first gear and the second gear when the upper pawl moves along the upper step; and
wherein the upper pawl is engaged with the first gear and the second gear, and the lower pawl is disengaged with the first gear and the second gear when the upper pawl moves along the lower step to shift the load tension between the load bearing state and the load releasing state during the incremental release of the load tension.

4. A tension assembly comprising:
a step shaped release track for an incremental release of a load tension;
a handle assembly;
an upper pawl slidably connected to the handle assembly;
a lower frame assembly;
a lower pawl slidably connected to the lower frame assembly; and
a hub received and rotatably disposed between the handle assembly and the lower frame assembly,
wherein the step shaped release track is formed on the lower frame assembly and includes an upper step and a lower step continuously formed with the upper step, and
wherein the upper pawl moves along the upper step and the lower step to shift the load tension between the upper pawl and the lower pawl during the incremental release of the load tension.

5. The tension assembly of claim 4, further including a first gear and a second gear positioned at opposite ends of the hub to engage and disengage with the upper pawl and the lower pawl as the upper pawl moves along the upper step and the lower step to shift the load tension between the upper pawl and the lower pawl during the incremental release of the load tension.

6. The tension assembly of claim 5, wherein the upper pawl is disengaged with the first gear and the second gear, and the lower pawl is engaged with the first gear and the second gear when the upper pawl moves along the upper step to shift the load tension to the lower pawl.

7. The tension assembly of claim 5, wherein the upper pawl is engaged with the first gear and the second gear, and the lower pawl is disengaged with the first gear and the second gear when the upper pawl moves along the lower step to shift the load tension to the upper pawl.

* * * * *